United States Patent
Mitchell et al.

(10) Patent No.: US 12,081,264 B1
(45) Date of Patent: Sep. 3, 2024

(54) BEACONS FOR OPTICAL LOCATION AND TRACKING

(71) Applicant: SA Photonics, Inc., Los Gatos, CA (US)

(72) Inventors: Greg G. Mitchell, Elk Grove, CA (US); David A. Pechner, Los Gatos, CA (US); Andrew K. McClaren, Santa Cruz, CA (US); Francis Gustav Muennemann, Menlo Park, CA (US)

(73) Assignee: SA PHOTONICS, INC., Los Gatos, CA (US)

(*) Notice: Subject to any disclaimer, the term of this patent is extended or adjusted under 35 U.S.C. 154(b) by 103 days.

(21) Appl. No.: 17/885,970

(22) Filed: Aug. 11, 2022

Related U.S. Application Data

(60) Provisional application No. 63/232,592, filed on Aug. 12, 2021.

(51) Int. Cl.
*H04B 10/11* (2013.01)
*H04B 10/40* (2013.01)
*H04B 10/50* (2013.01)
*H04B 10/60* (2013.01)

(52) U.S. Cl.
CPC .............. *H04B 10/11* (2013.01); *H04B 10/40* (2013.01); *H04B 10/50* (2013.01); *H04B 10/60* (2013.01)

(58) Field of Classification Search
CPC ..................................................... H04B 10/11
See application file for complete search history.

(56) References Cited

U.S. PATENT DOCUMENTS

| | | | | |
|---|---|---|---|---|
| 3,662,180 | A | * | 5/1972 | Jorgensen ............. G01S 1/7038 398/118 |
| 5,082,364 | A | | 1/1992 | Russell |
| 5,159,480 | A | * | 10/1992 | Gordon .................. H04B 10/11 398/131 |
| 5,455,670 | A | | 10/1995 | Payne et al. |
| 7,206,063 | B2 | | 4/2007 | Anderson et al. |
| 7,457,370 | B2 | * | 11/2008 | Jurgensen ............... H04L 27/18 375/295 |
| 7,551,293 | B2 | | 6/2009 | Yelin et al. |
| 9,933,521 | B2 | | 4/2018 | Riley et al. |
| 9,954,613 | B1 | * | 4/2018 | Goorjian ............. H04B 10/118 |

(Continued)

OTHER PUBLICATIONS

Horn, E. et al. "Toward Optimal Structured Light Patterns." Image and Vision Computing, vol. 17, No. 2, Feb. 1999, pp. 87-97.

*Primary Examiner* — Darren E Wolf
(74) *Attorney, Agent, or Firm* — BakerHostetler

(57) ABSTRACT

A free space optical (FSO) transmitter emits multiple, orthogonally encoded, beacons having a known pattern of spatial overlap. A receiver includes a sensor and a computing system. The sensor senses the overlapping optical beacons and produces an output signal indicative of an optical power of the overlapping optical beacons. The computing system separates the output signal into components from the different beacons according to the orthogonal encoding of the beacons. Based on strengths of the components and on the known pattern of spatial overlap, the computing system may determine at least one of: (1) a position of the receiver relative to the transmitter, (2) a position of the receiver in the beacon pattern, or (3) an orientation of the receiver relative to the transmitter.

20 Claims, 15 Drawing Sheets

(56) References Cited

U.S. PATENT DOCUMENTS

| | | | |
|---|---|---|---|
| 2002/0109884 A1* | 8/2002 | Presley | H04B 10/1125 398/140 |
| 2003/0053164 A1* | 3/2003 | Stappaerts | H04B 10/1121 398/5 |
| 2003/0090765 A1* | 5/2003 | Neff | H04B 10/1127 398/126 |
| 2011/0255858 A1* | 10/2011 | Xie | H04J 14/06 398/1 |
| 2011/0318021 A1* | 12/2011 | Zhou | H04L 27/0014 375/376 |
| 2013/0330088 A1* | 12/2013 | Oshima | H04B 10/11 398/130 |

* cited by examiner

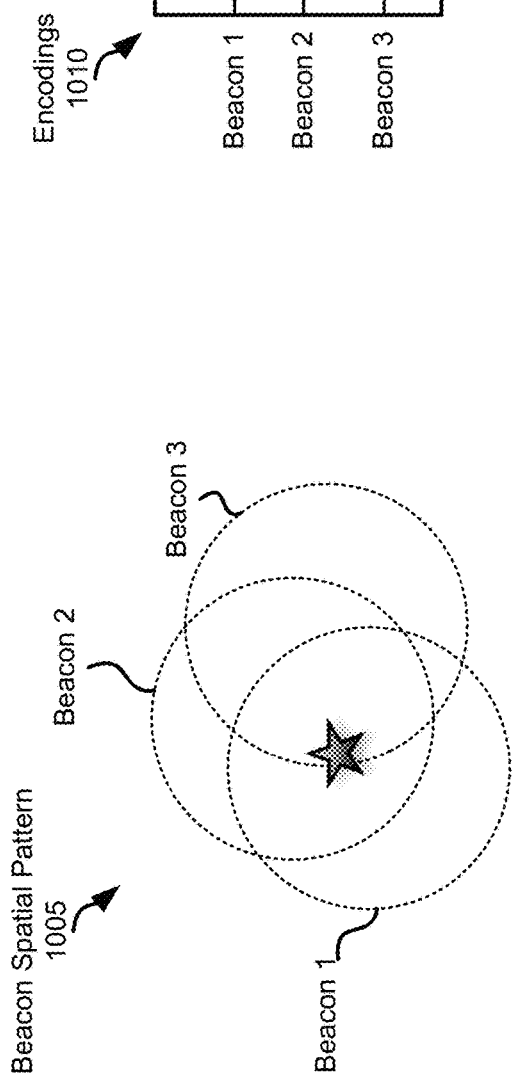
FIG. 10A
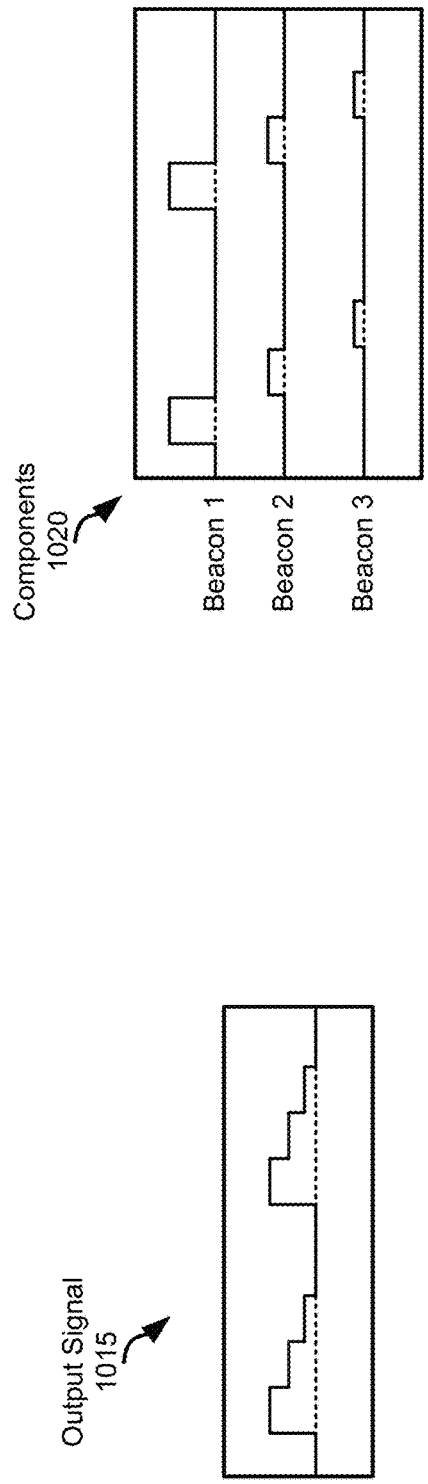
FIG. 10B
FIG. 10C
FIG. 10D

BEACONS FOR OPTICAL LOCATION AND TRACKING

CROSS-REFERENCE TO RELATED APPLICATION

This application claims priority under 35 U.S.C. § 119(e) to U.S. Provisional Patent Application Ser. No. 63/232,592, "Encoded and Structured Beams for Optical Location and Tracking," filed on Aug. 12, 2021, which is incorporated herein by reference in its entirety.

BACKGROUND

1. Technical Field

This disclosure relates generally to free space optical (FSO) communications, and more particularly, to aligning FSO terminals using beacons.

2. Description of Related Art

FSO communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations. In contrast with other electromagnetic communications means, FSO signals are more directional ("FSO signals" refers to light propagating between terminals). The directionality confers benefits both for communications capacity and for communications privacy.

However, high directionality demands accurate beam pointing between terminals and renders communication unpredictable if the FSO beams miss their intended targets. For example, if an FSO terminal is mounted on a tower, strong winds may move the tower such that the FSO terminal sways with the tower. In another example, an FSO terminal is mounted on a flying vehicle that communicates with a stationary FSO terminal. In these and similar situations, high directionality may require rapid adjustment and accurate pointing to establish and maintain a reliable FSO communication link.

SUMMARY

This disclosure relates to techniques for using encoded and spatially structured optical beams to support pointing and tracking (PAT) between separated FSO terminals.

A free space optical (FSO) transmitter terminal emits multiple, orthogonally encoded, optical beacons having a known pattern of spatial overlap. An FSO receiver terminal includes an optical sensor and a computing system. The optical sensor senses the overlapping optical beacons and produces an (e.g., electrical) output signal indicative of an optical power of each of the overlapping optical beacons. The computing system separates the output signal into components from the different optical beacons according to the orthogonal encoding of the optical beacons. Additionally, based on strengths of the components (e.g., relative strengths) and on the known pattern of spatial overlap, the computing system may determine at least one of: (1) a position of the FSO receiver terminal relative to the FSO transmitter terminal, (2) a position of the FSO receiver terminal in the beacon pattern, or (3) an orientation of the FSO receiver terminal relative to the FSO transmitter terminal.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 10A is an example beacon spatial pattern that includes three overlapping beacons.

FIG. 10B is a diagram of encodings for the beacons in FIG. 10A.

FIG. 10C is a diagram of an output signal of a receiver in the spatial pattern of FIG. 10A.

FIG. 10D is a diagram of beacon components separated from the output signal in FIG. 10C.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FSO Communication Terminals

Figure 1A:
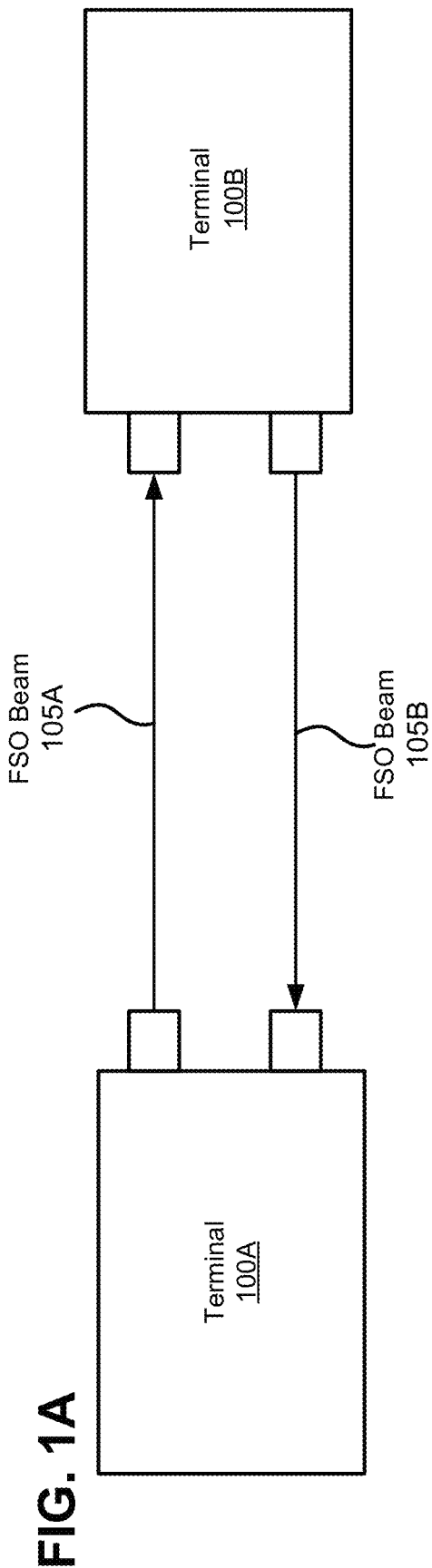
FIGS. 1A and 1B illustrate block diagrams of FSO terminals communicating via FSO communication links.
Figure 1B:
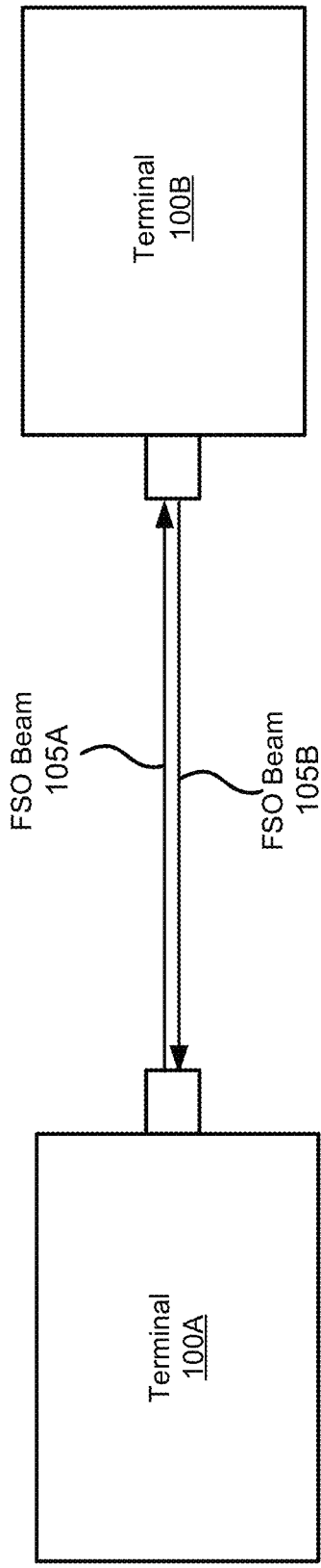

FIGS. 1A and 1B are block diagrams of terminals 100A and 100B (also referred to as nodes) communicating via free space optical (FSO) communication links. Specifically, the terminals 100 are communicating by transmitting and receiving data encoded FSO beams 105. In FIG. 1A, each terminal 100 receives and transmits data encoded FSO beams 105 through different apertures, while in FIG. 1B, the terminals are co-boresighted so that beams are received and transmitted though the same aperture. As described herein, if terminal 100A is referenced as a local terminal, terminal 100B may be referred to as a remote terminal, beam 105A may be referred to as a transmit (Tx) beam, and beam 105B may be referred to as a receive (Rx) beam. Furthermore, a terminal transmitting a data encoded FSO beam (or beacon) may be referred to as a transmitter and a terminal receiving a data encoded FSO beam (or beacon) may be referred to as a receiver.

As illustrated, the terminals 100 are pointing at each other. This results in the data encoded FSO beams being received by the apertures of the receiving terminals 100. Aligning FSO terminals so that they direct their FSO beams toward each other may include a beam acquisition process. The optical beams used for the beam acquisition process may be referred to as beacons. A beacon may also be used during other alignment processes, such as during a beam tracking process, which helps maintain alignment as data encoded FSO beams are transmitted and received. Generally, beacons are used for aligning terminals with each other while data encoded FSO beams are used to communicate data moving through a network. Beacons typically have larger divergences than data encoded FSO beams. Beam divergence is a measure of the increase in a beam's diameter or radius with distance. For example, the divergence of a beacon may be two to four times larger than the divergence of a data encoded FSO beam (however larger and smaller ratios are also possible). In some cases, data encoded FSO beams are modulated at very high (e.g., data communications grade) frequencies (e.g., GHz), while beacon's modulation frequency may be much smaller (e.g., ~Hz to kHz). In some cases, data encoded FSO beams are of narrow spectral bandwidth (e.g., about a nanometer (nm)), while beacons are broadband (e.g., ~ 20-100 nm) bandwidth.

A terminal 100 transmitting or receiving beacons is not required to transmit or receive data encoded FSO beams. For example, a receiver terminal may receive beacons to determine its position without transmitting or receiving data encoded FSO beams. Furthermore, it is not required for a terminal to have both transmit and receive capabilities. In some embodiments, a terminal (e.g., 100A) is configured to transmit beacons but not detect beacons. Similarly, another terminal (e.g., 100B) may be configured to receive beacons but not transmit beacons.

Figures 2A, 2B, 2C:
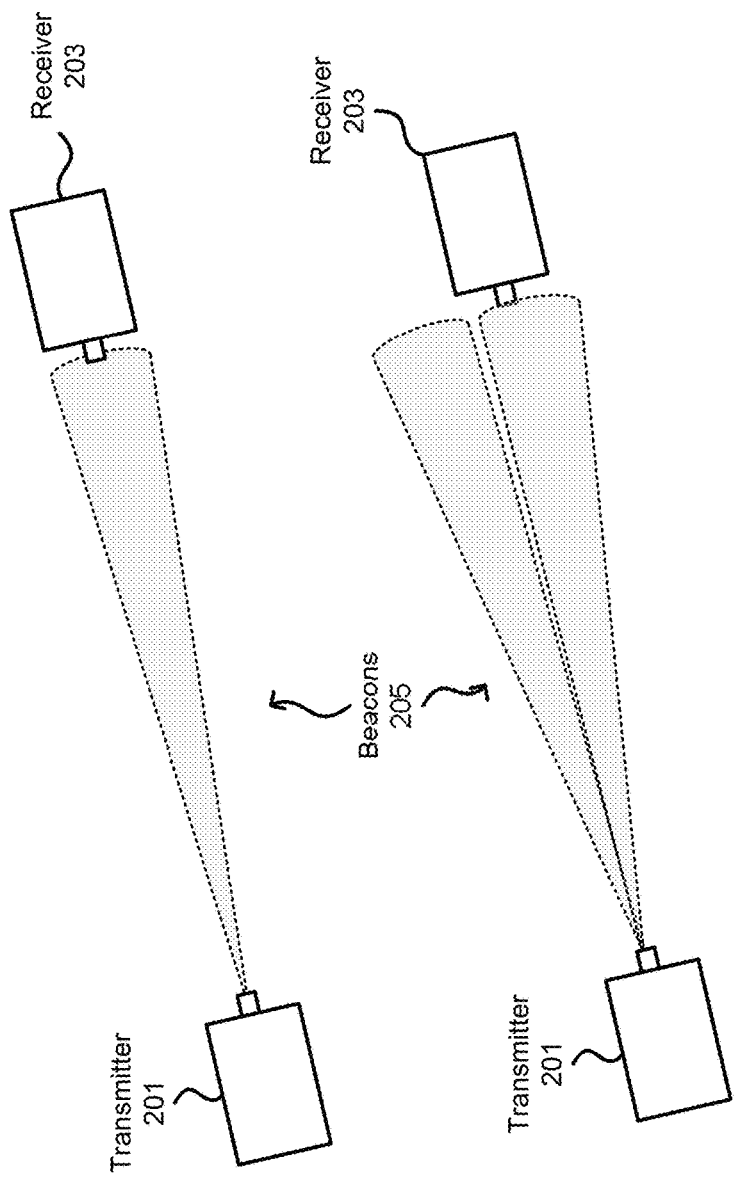
FIGS. 2A-2C are block diagrams of FSO terminals using beacons.

FIGS. 2A-2C are block diagrams that illustrate FSO terminals using beacons 205, according to some embodiments. The figures include a transmitter 201 transmitting one or more beacons 205 in different directions and a receiver 203 receiving one or more of the beacons 205. The terminals may be stationary or moving (e.g., coupled to or part of a moving vehicle or object). The receiver 203 can use the received beacons 205 determine its position or orientation (e.g., relative to the transmitter 201). It may be useful for the receiver 203 to determine its position or orientation, for example, if the receiver 203 is trying to align itself with the transmitter 201 to communicate via an FSO communication link. In another example, if the receiver 203 is moving through an environment and the transmitter 201 is located at a known position in the environment, detecting beacons 205 may help the receiver determine its position in the environment.

In FIG. 2A, the transmitter 201 transmits a single beacon 205. In FIG. 2B, the transmitter 201 is transmitting two spatially separated beacons 205 through a same aperture. The beacons 205 may be arranged in a predetermined pattern. Transmitting multiple beacons 205 may increase the area over which the receiver 203 can receive a beacon 205 from the transmitter 201. In some embodiments, each beacon 205 is encoded differently so the receiver can determine which beacon 205 is it sensing. In FIG. 2C, the transmitter 201 is transmitting two spatially overlapping beacons 205 through a same aperture. Like FIG. 2B, the beacons 205 may be arranged in a predetermined pattern, and the multiple beacons 205 may increase the area over which the receiver 203 can receive a beacon 205 from the transmitter 201. Furthermore, as further described below, overlapping beacons 205 may provide additional information that the receiver 203 can use to determine its position or orientation relative to the transmitter or to the beacon pattern.

Figure 3A:
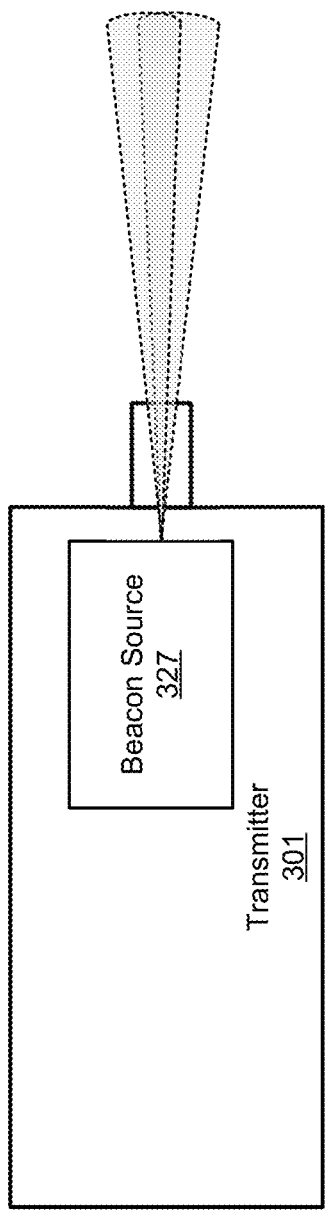
FIG. 3A is a block diagram of an FSO transmitter terminal configured to transmit beacons.

FIG. 3A is a block diagram of an FSO transmitter terminal 301 configured to transmit beacons, according to an embodiment. The transmitter 301 includes a beacon source 327. The transmitter 301 may include additional, fewer, or different components than those illustrated. For example, the transmitter 301 includes a controller module, an optical telescope, a beam steering unit, or optical fibers. In another example, the transmitter 301 includes components to transmit and receive data encoded FSO beams.

The beacon source 327 is a light source that emits a beacon (or multiple beacons), such as a light emitting diode (LED) or a laser. A source 327 may emit light of any wavelength. For example, light in the visible or near-infrared bands between 380 nm and 1000 nm wavelength is produced. In another example, the light is infrared at 1550 nm. To emit multiple beacons, a beacon source 327 may be wavelength tunable or the transmitter 301 may include multiple sources 327 so that it can emit beacons at different wavelengths (e.g., a beacon source 327 includes a red, green, and blue LED). In some embodiments, the source 327 emits different beacons in a sequence. This may allow for higher per-beam power e.g., because only one beam is emitted at a time. The sequence of transmitted beams may follow a predetermined sequence. Example sequence patterns include a rectangular raster, a spiral, or a pseudorandom sequence.

In some embodiments, the beacon source emits encoded beacons (e.g., time-variable modulation, wavelength modulation, amplitude modulation, or a combination of these). A beacon coding is any beam characteristic that enables a receiver terminal (e.g., 303) to distinguish the beacon's signal from another signal. For example, beacons are encoded such that a receiver terminal can determine the power received by each beacon. In addition to helping distinguish one beacon from another, the type of encoding may help distinguish a beacon from a data-encoded FSO beam, for example during a tracking process in which beacons and data-encoded FSO beams are both received. Additionally, or alternatively, beacon encoding may help discriminate from DC sunlight and other DC background sources.

Beacons may have orthogonal encodings. Orthogonal codes are such that if a receiver (e.g., 303) receives a signal formed from multiple orthogonally encoded beacons, the components (e.g., amplitude and timing offset) of each beacon can be extracted from the combined signal. Beacons having different optical wavelengths, for example, are orthogonal if the receiver can detect and distinguish the wavelengths. In contrast, non-orthogonal codes are such that a receiver receiving a signal formed from multiple beacons cannot identify the individual beacon components unless one component is significantly larger in amplitude (e.g., four times or more).

Many beacon coding schemes are possible and multiple schemes may be used by a single transmitter 301. This may allow, for example, combined decoding from multiple schemes may make otherwise non-orthogonal coding orthogonal. In a first encoding example, each beacon is emitted with a different optical wavelength. A receiver terminal (e.g., 303) may distinguish these beacons spectrographically. In a second encoding example, each beacon is uniquely temporally encoded (e.g., each beam is modulated at a different frequency). A set of twenty beacons can, for example, be uniquely encoded with modulation frequencies from 20 kHz to 400 kHz, with each beacon having a unique amplitude modulation at 20 kHz intervals. Other temporal encoding schemes may be used as well, such as mutually orthogonal code sequences.

Figure 3B:
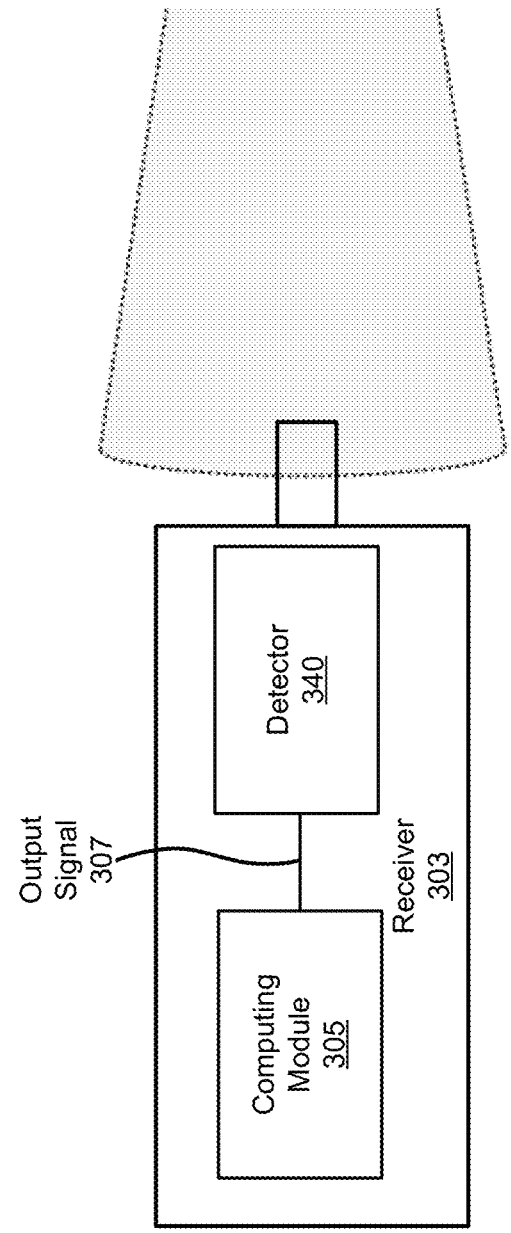
FIG. 3B is a block diagram of an FSO receiver terminal configured to receive beacons.

FIG. 3B is a block diagram of an FSO receiver terminal 303 configured to receive beacons, according to an embodiment. The receiver 303 includes a computing module (also referred to as a computing system) and a detector 340. The receiver 303 may include additional, fewer, or different components than those illustrated. For example, the receiver 303 includes a controller module, an optical telescope, a beam steering unit, or optical fibers. In another example, the receiver 303 includes components to transmit and receive data encoded FSO beams. In some embodiments, the computing module 305 is in the transmitter 301. For example, the output signal 307 is communicated to the transmitter via an FSO or RF (radio frequency) communication link.

The beacon detector 340 (also referred to as an optical sensor) senses optical signals (e.g., beacons) and produces (e.g., electrical) an output signal 307 indicative of the optical power received from the optical signals (e.g., the output signal 307 represents, is proportional to, or approximate to the power received by the detector 340). The detector 340 may be a photodetector or multiple photodetectors. In some embodiments, the detector 340 is not a camera. The detector 340 may be capable of detecting different types of light signals, e.g., low and high light intensities, specific wavelengths, etc. This allows the receiver 303 to operate in low light (e.g., at night) and high light situations (e.g., at midday). In some embodiments, the detector 340 includes wavelength filters to filter out non-beacon wavelengths (e.g., so that only beacon light is captured by the detector).

The computing module 305 receives and processes the output signal 305 from the detector. For example, the computing module 305 separates the output signal into components that describe the individual contributions of the sensed optical signals (assuming multiple optical signals are sensed). For example, if the detector 340 detects two overlapping (orthogonally encoded) beacons, the computing module 305 can determine the component of each beacon in the output signal 307. The computing module 305 may also be able to identify non-beacon signal components, such as data encoded FSO beams, general background noise, and sunlight.

After analyzing an output signal 307, the computing module 305 may determine a position or orientation of the receiver based on the analysis. For example, the computing module 305 can determine the position of the receiver 303 based on the relative strengths (e.g., amplitudes) of the components from beacons. Subsequent to determining a position or orientation of the receiver, the computing module may provide instructions to change the position or orientation of the receiver.

Determining the position or orientation of the receiver based on the relative strengths of the components assumes the beacons are individually identifiable and arranged in a pattern with spatial overlap that is known by the computing module 305. Thus, the beacon pattern and beacon encodings may be predetermined or actively communicated to the receiver e.g., a transmitter communicates the pattern to the receiver 303 (e.g., using a data encoded FSO beam or radio channel). A beacon pattern describes the positions of beacons relative to other beacons in the pattern. A pattern may also describe the position of the pattern relative to the transmitter. Additionally, or alternatively, a beacon pattern may describe characteristics of the beacons in the pattern, such as the divergences of the beacons, the amount of spatial overlap of the beacons, the relative angular spatial orientation of the beacons, or the power distributions of the beacons.

The computing module 305 can be implemented using hardware, firmware, or software. The computing module 305 may be a computing device that executes instructions stored on a computer-readable storage medium to perform operations. The computing module 305 can include any electronics or computer instructions that process the output signal 307 corresponding to the received light, which may be embodied in digital or analog circuits, implementing using any one or more of Application Specific Integrated Circuits (ASICs), field-programmable gate arrays (FPGAs), and general purpose computing circuits, along with corresponding memories and computer program instructions for carrying out operations on the data. The specifics of these components are not shown for clarity and compactness of description.

Figure 4:
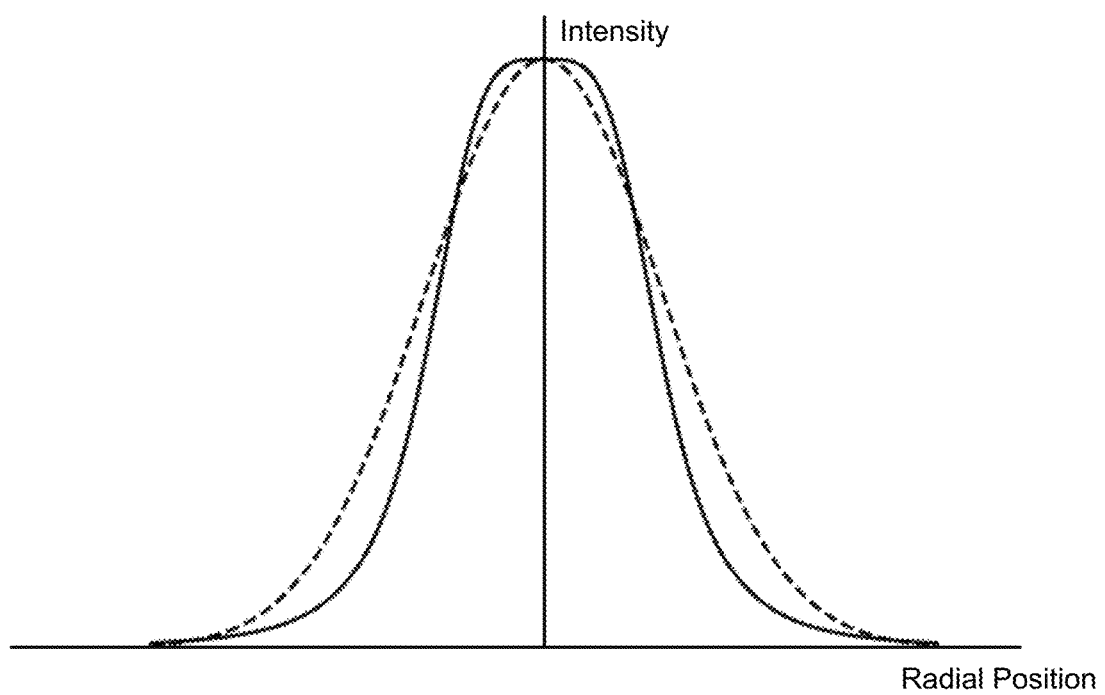
FIG. 4 illustrates example spatial power distributions of beacons.

FIG. 4 illustrates example spatial power distributions of beacons, according to an embodiment. Specifically, FIG. 4 is a plot of beam intensity vs. radial position from the beam axis. The dashed line represents a beacon with a Gaussian distribution, and the solid line represents a beacon with a modified distribution that a transmitter may emit due to engineering considerations.

Although not illustrated, the intensity of a beacon may be symmetric about the beam axis. This is not required though. For example, one or more beacons may have non-circular profiles or may have multiple disjoint profiles separated by some larger angle (e.g., five degrees). A design with disjoint profiles may create non-circular profiles for each of the disjoint segments. This arrangement may be useful when overlaid encoding groups (described further with respect to FIG. 5D). For example, a beacon transmitted at an angle may have an elliptical profile (e.g., with the long axis being along the horizontal axis) so that the profile perceived by a receiver (e.g., aircraft) is circular.

Figure 5A:
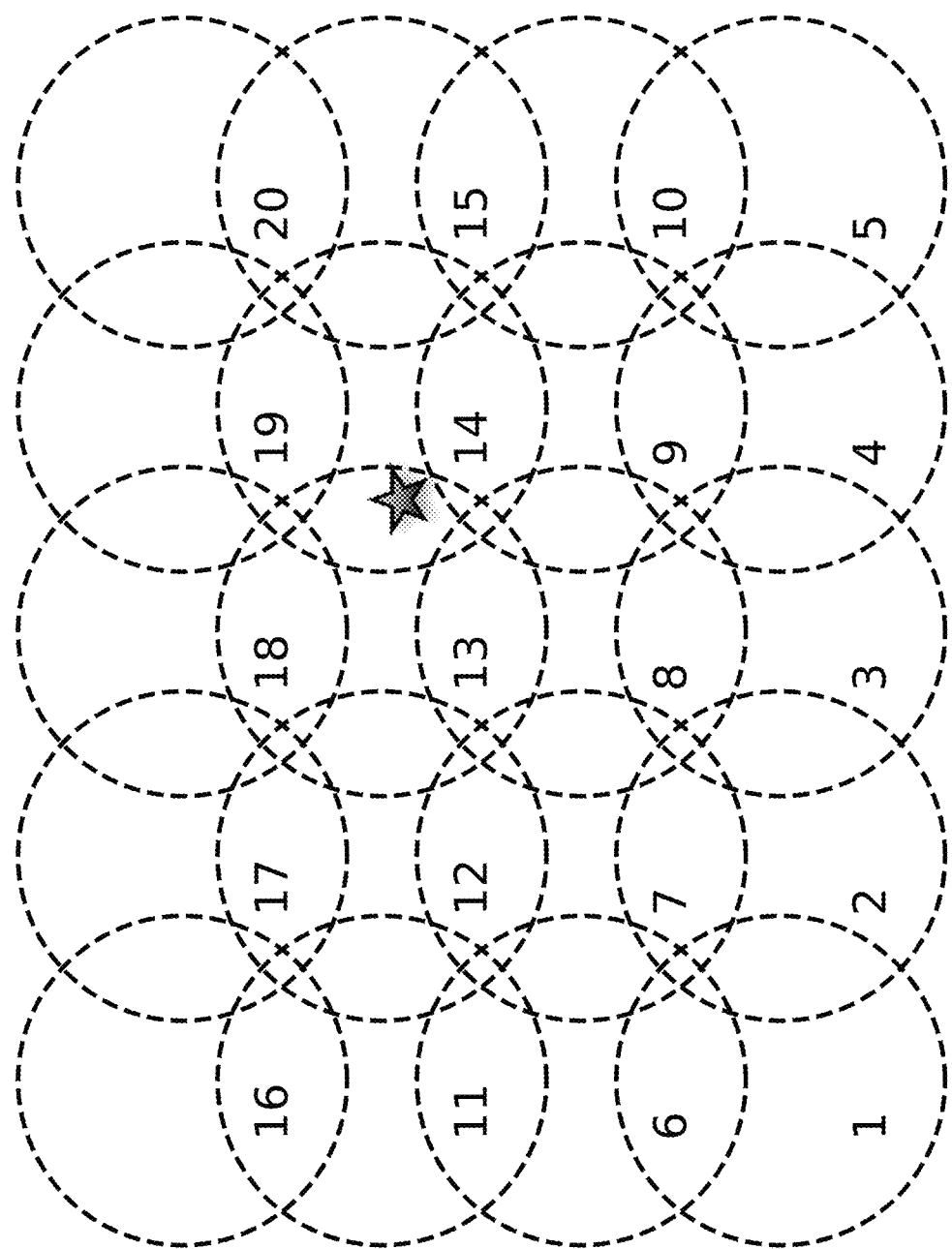
FIGS. 5A-5D are example beacon spatial patterns that may be emitted by one or more transmitters.

FIG. 5A is an example beacon spatial pattern that may be emitted by one or more transmitters. The beacons are spatially distributed in a grid pattern (although other patterns are possible, such as circular, hexagonal, and triangular patterns), with five beacons in each row and four beacons in each column. Each dashed circle represents the beacon half-power cross-section (applies whether the beacons have Gaussian or non-Gaussian profiles).

Each beacon is labeled with a number (1-20), and each beacon spatially overlaps with neighboring beacons in the pattern. In this example, beacons in the grid are orthogonally encoded. The star represents the position of an aperture of a receiver terminal. At the position in FIG. 5A, the receiver may receive light from beacons 8, 9, 13, 14, 18, and 19 (since the dashed lines represent half-power). Based on the sensed beacon powers (or intensities), the receiver may determine it is closest to beacon 14 (since the star is closest to the beam axis of beacon 14). Thus, assuming the spatial pattern (and associated encodings) is known by the receiver, the receiver may determine an estimate of its position in the grid. However, by determining the relative powers (or intensities) of the other sensed beacons, the receiver may determine a more accurate estimate of its position. For example, by comparing the power of beacon 13 relative to beacon 14, the receiver determines its position along the horizontal axis of the beacon grid. Similarly, by comparing the powers of beacons along the vertical axis (e.g., beacons 9 and 19), the receiver can determine its position along the vertical axis of the beacon grid.

Regarding the beacon encodings in the grid, the encodings may be based on the column and row. For example, beacons along a given row may have different wavelengths and beacons along a given column have different amplitude modulations. To further the example, vertical rows may be encoded with 20 kHz, 40 kHz, 60 kHz, and 80 kHz modulations. Thus, the wavelength and frequency encoding of a given beacon determine the beacon's position in the grid.

Note that the beacons in FIG. 5A have the same divergence, the same power distributions, and similar amounts of overlap with each other. These characteristics are not required in a beacon spatial pattern though. For example, beacons with different divergences, overlap, and power distributions may also form a beacon spatial pattern.

Figure 5B:
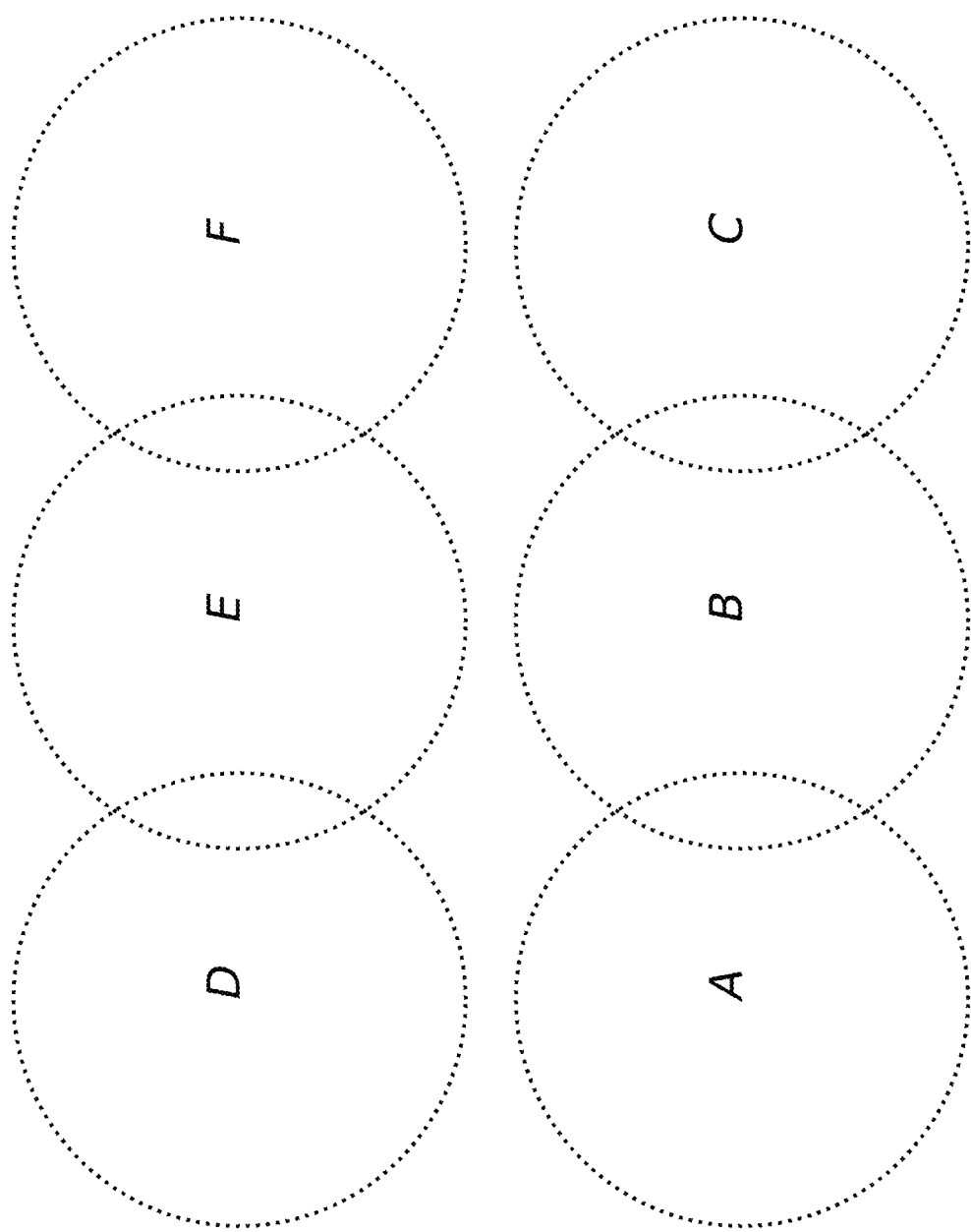

FIG. 5B is another example beacon spatial pattern that may be emitted by one or more transmitters. The beacons are spatially distributed in a grid pattern (labeled A-F) with three beacons in each row and two beacons in each column. Each dashed circle represents the beacon half-power cross-section (applies whether the beacons have Gaussian or non-Gaussian profiles). Compared to FIG. 5A, the pattern in FIG. 5B has fewer beacons, the beacons in FIG. 5B have larger divergences, and the beacons in FIG. 5B are more dispersed (thus resulting in less beacon overlap). An advantage of this pattern is that fewer beacons (and encodings) may be used.

Figure 5C:
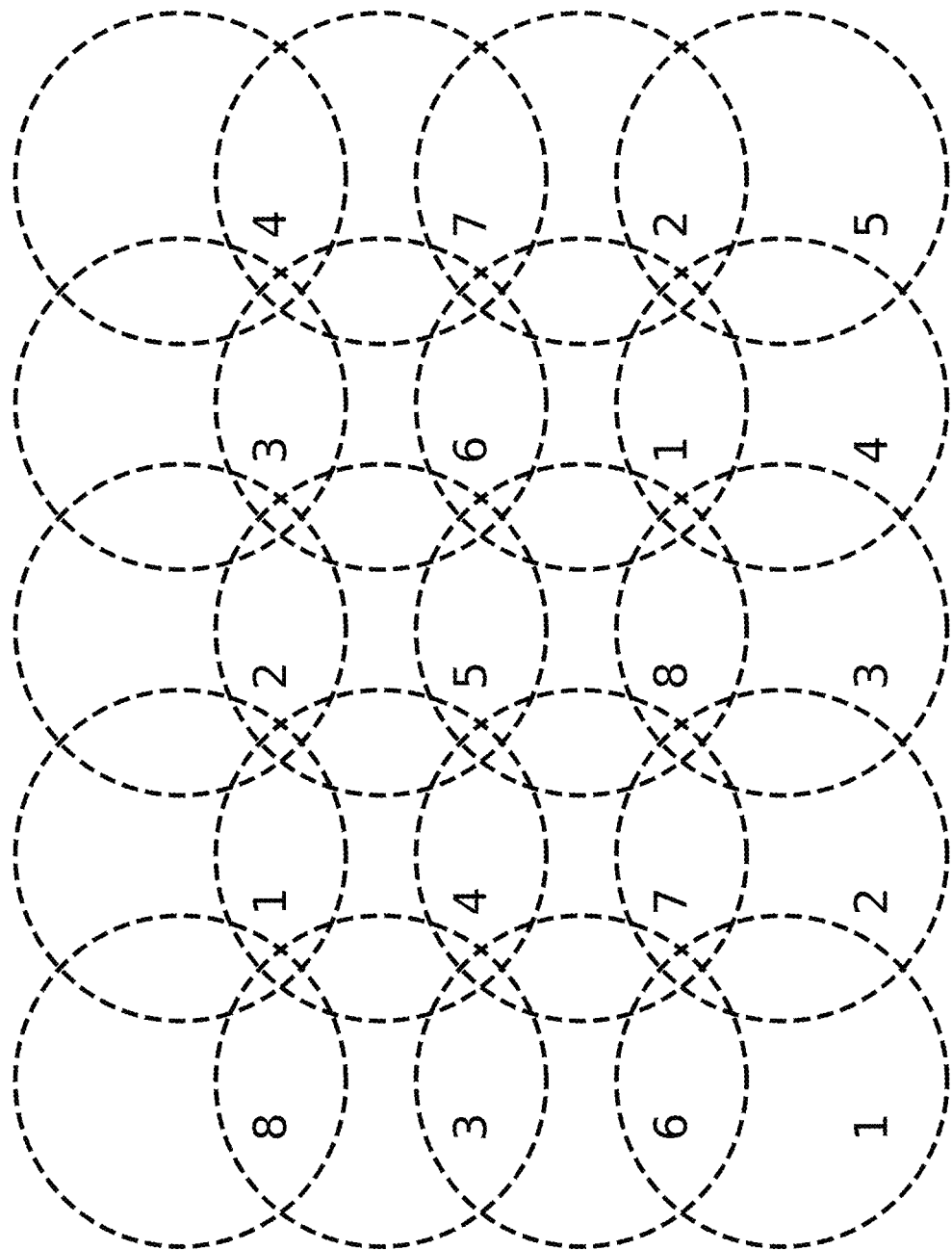

FIG. 5C is another example beacon spatial pattern that may be emitted by one or more transmitters. The beacons are spatially distributed in a grid pattern with five beacons in each row and four beacons in each column. Each dashed circle represents the beacon half-power cross-section (applies whether the beacons have Gaussian or non-Gaussian profiles). Encoding schemes are re-used in FIG. 5C (indicated by repeated beacon labels). Thus, there are fewer total encoding schemes. This reduces the complexity of implementing e.g., twenty orthogonal encoding schemes. However, this spatial pattern may lead to ambiguity. For example, if a receiver senses and identifies beacon 5, it may be unclear if the receiver is in the center of the grid or in the bottom right corner. This ambiguity can be resolved by changing the locations of the encoding schemes or including (e.g., overlaying) additional beacons (described below with respect to FIG. 5D).

Figure 5D:
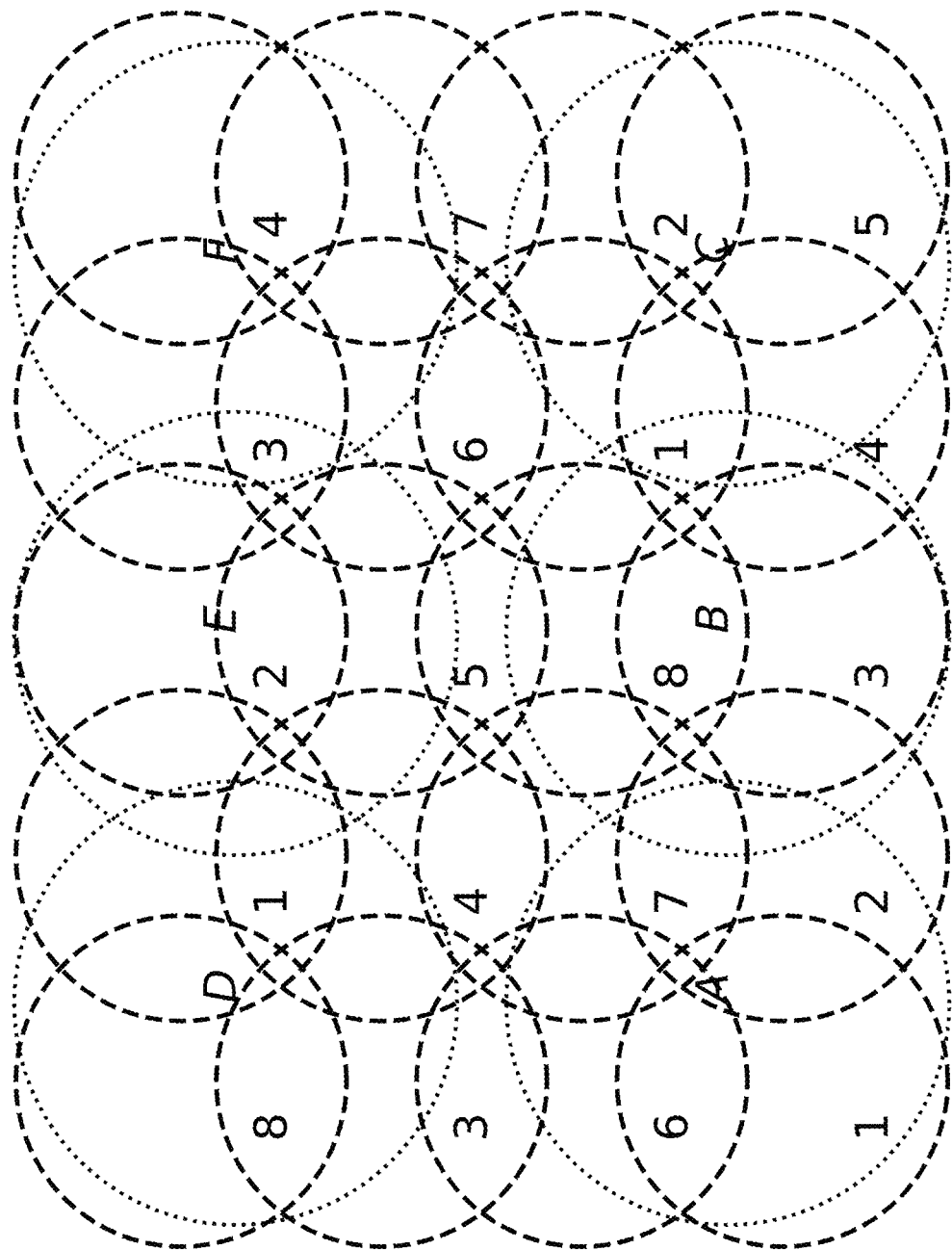

FIG. 5D is an example beacon spatial pattern that includes the spatial pattern of FIG. 5B overlaid onto the spatial patter of FIG. 5C. In this example, the encodings of beacons A-F are orthogonal to beacons 1-8. By combining these different spatial patterns to form a new pattern, a receiver in the new pattern can better determine its position (compared to a receiver in the pattern of FIG. 5C). For example, if a receiver senses and identifies beacons C and 5, it may determine that it is in the bottom right corner of the grid as opposed to the center of the grid. An advantage of this spatial pattern is that only fourteen orthogonal encodings are used, and a receiver can determine its position in the pattern. Thus, combining multiple beacon patterns (e.g., with different divergences or encoding) may be used to create a very efficient beacon pattern.

Figure 6A:
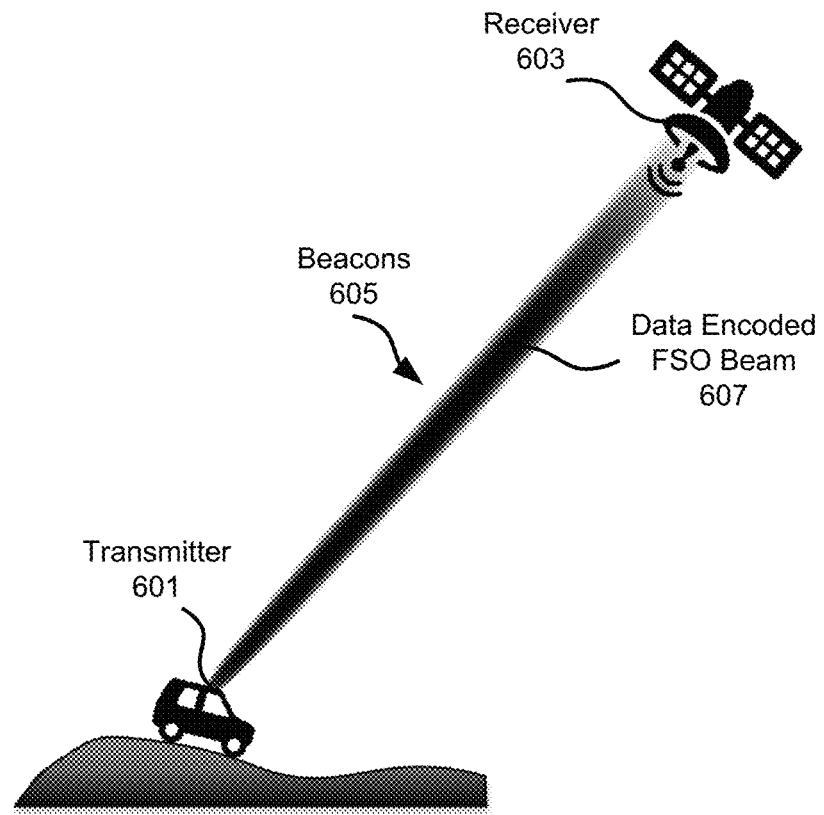
FIG. 6A illustrates an example of a transmitter and a receiver communicating while on moving through an environment.

FIG. 6A illustrates an example of a transmitter 601 and a receiver 603 communicating via a unidirectional link while on moving through an environment. The terminals are attempting to transfer (e.g., network) data from the transmitter 601 to the receiver 603. In the example of FIG. 6A, the transmitter 601 is part of a car that is driving along an undulating road and the receiver 603 is part of a satellite flying (e.g., orbiting) above the transmitter 601. Thus, the transmitter 601 or receiver 603 may be moving unpredictably while trying to communicate via a high data rate FSO communication link. In another example situation similar to FIG. 6A, a transmitter is coupled to a buoy in the ocean and a receiver is coupled to a plane flying over the buoy.

Figure 6B:
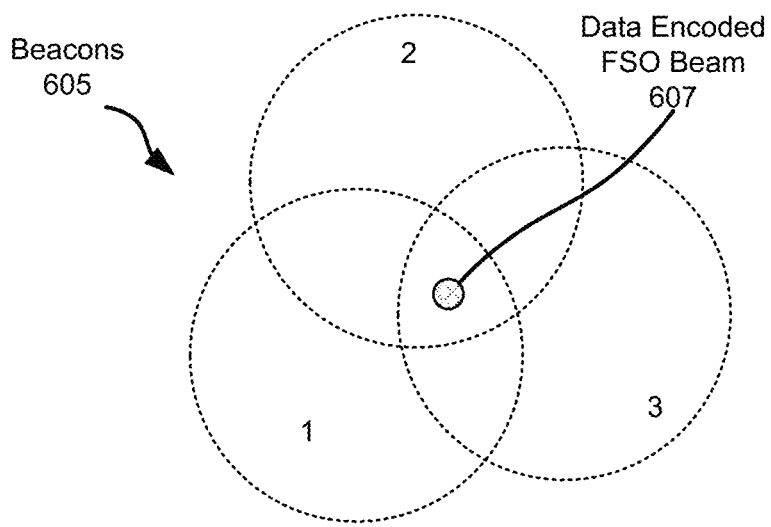
FIG. 6B is a cross-section of the beacons in FIG. 6A.

The transmitter 601 is transmitting three beacons 605 with spatial overlap toward the receiver 603 and a (e.g., high data rate) data encoded FSO beam 607. In some embodiments, the receiver 603 in also transmits beacons and a data encoded FSO beam to the transmittal 601. FIG. 6B is a cross-section of the beacons 605 (labeled 1-3). In this example, the circles represent the edges of each beacon. Each of the optical beams (the three beacons 605 and the FSO beam 607) may have distinct encodings. As described below, the overlapping beacons help improve optical alignment between the terminals and thus help increase the data transfer rate.

By identifying components from the different beacons (e.g., based on the different beacon encodings), the receiver 603 can determine its optical alignment with the transmitter. For example, if the receiver 603 only receives beacons 1 and 3, it may shift its optical alignment (e.g., by adjusting its position or orientation) upward and slightly to the left (from the perspective of FIG. 6B) to better align with the transmitter 601 (since the beacon spatial pattern is known). In another example, if the receiver 603 receives beacons 1, 2, and 3, and the relative powers are about equal (e.g., within 5%), the receiver 603 may determine that it is aligned with the transmitter 601 (receiving the data encoded FSO beam 607 is additionally, or alternatively, an indication of alignment).

In some embodiments, the transmitter 601 and receiver 603 include a return communication channel from the receiver 603 to the transmitter 601 to communicate information to the transmitter 601. For example, the receiver 603 transmits beacons or data encoded FSO beams to the transmitter 601. Additionally, or alternatively, the return channel is a (e.g., narrowband) radio channel. In embodiments with a return communication channel, the receiver 603 may communicate alignment, position, or orientation information to the transmitter 601. The transmitter 601 may then use the received information to update its beam pointing direction, thus improving optical alignment between the terminals.

Example Applications

As previously described, a beacon pattern may be used to track the trajectory of a vehicle. One example is tracking the trajectory of an aircraft during a landing approach. In some embodiments, multiple receivers are coupled (e.g., mounted) at known positions on the aircraft, such as on the landing gear (e.g., so the receivers become activated during landing and maintain line-of-sight with the transmitter). By determining the positions of the receivers in a beacon pattern, the aircraft may use the difference in positions to determine aircraft attitude as well as position or orientation relative to the transmitter. For example, the aircraft tracks its position and attitude by repeatedly identifying the receivers' positions in a beacon pattern.

Figure 7:
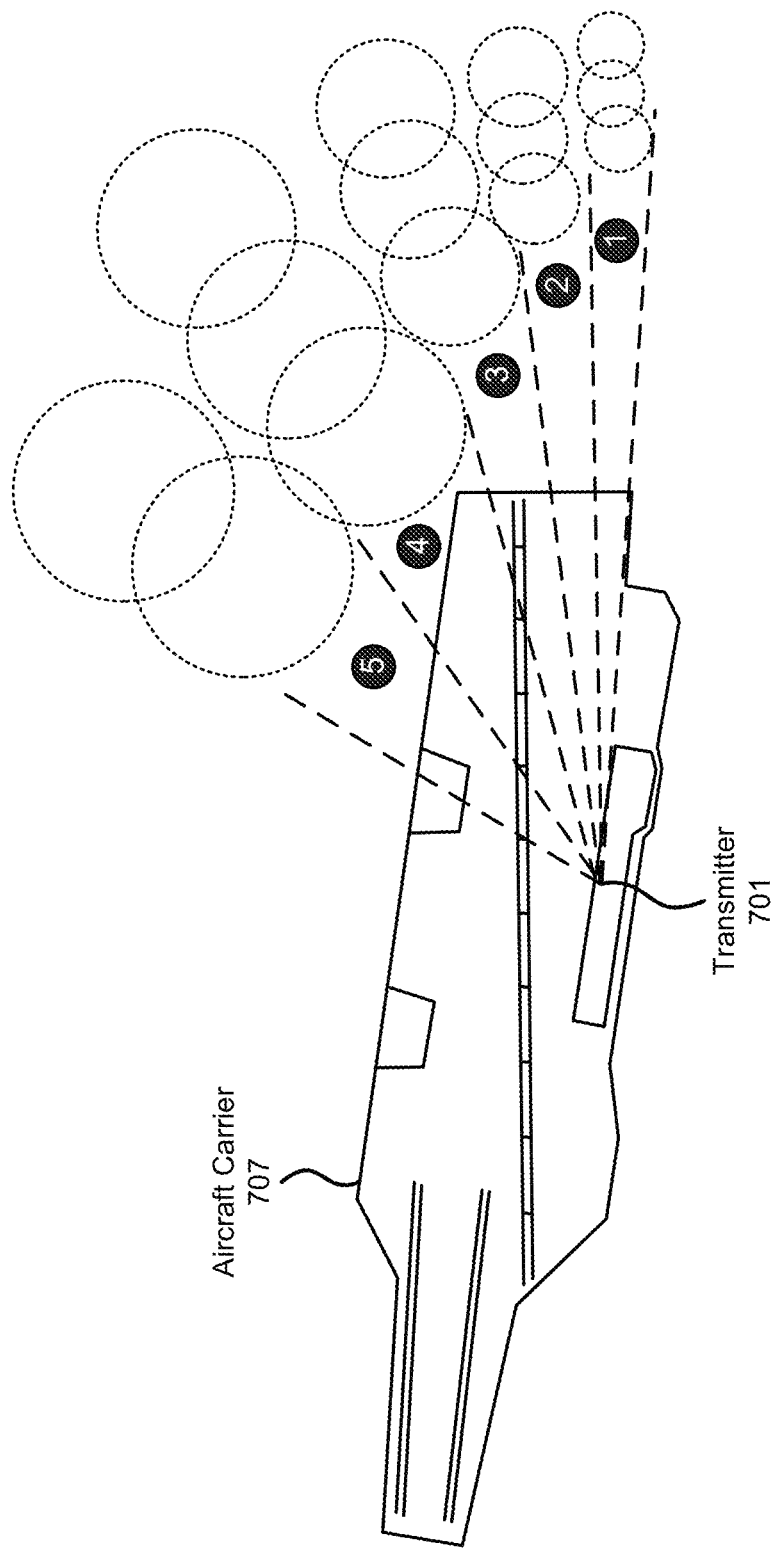
FIG. 7 is a diagram of an aircraft carrier with a transmitter emitting different beacon spatial patterns.

FIG. 7 is a diagram of an aircraft carrier 707 with a transmitter 701 (or transmitters) emitting different beacon spatial patterns (labeled groups 1-5). As illustrated, beacons within a group overlap but don't overlap with beacons in other groups (the circles represent the edges of the beacons). However, in other embodiments, beacons in a group may spatially overlap with beacons in another (e.g., adjacent) group. The groups cover different azimuth angle ranges of the carrier 707. The groups may help an aircraft (with one or more receivers) determine its azimuth angle relative to the carrier 707 while approaching to land (since the azimuth angle changes rapidly when landing). The aircraft may also use the overlap in the beacons to determine its attitude. For example, position data extracted by the one or more receivers (of the aircraft) may be used to provide the approaching aircraft with continuous position and attitude data. For longer ranges (earlier in the aircraft's approach), the transmitter 701 may use narrower beacons to successfully transmit over the longer range. More divergent beacons may be more appropriate for tracking at closer range, where angular direction changes rapidly. Thus, in FIG. 7, group 1 covers the smallest azimuth range, group 2 covers a larger azimuth range than group 1, group 3 covers a larger azimuth range than group 2, etc. As previously described, each beacon may be encoded so it can be identified by a receiver. Beacon encodings may be re-used on non-adjacent groups (e.g., groups 1 and 3 may have the same or similar encodings), and beacon encodings may be unique within each group (e.g., all encodings in group 1 are orthogonal to each other).

Additional Examples of Beacon Encoding

Figure 8A:
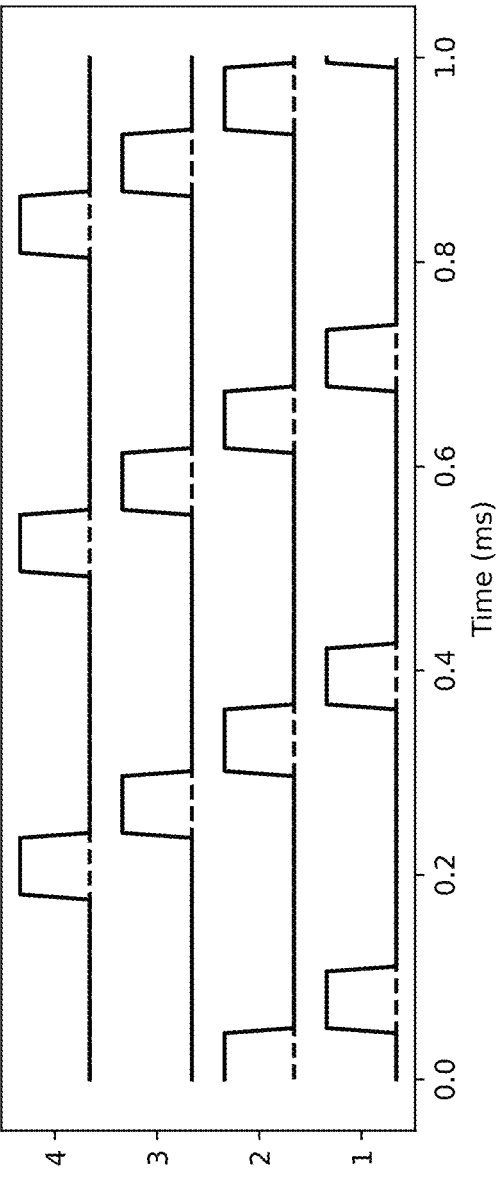
FIGS. 8A-8C are diagrams of example encodings for beacons.
Figure 8B:
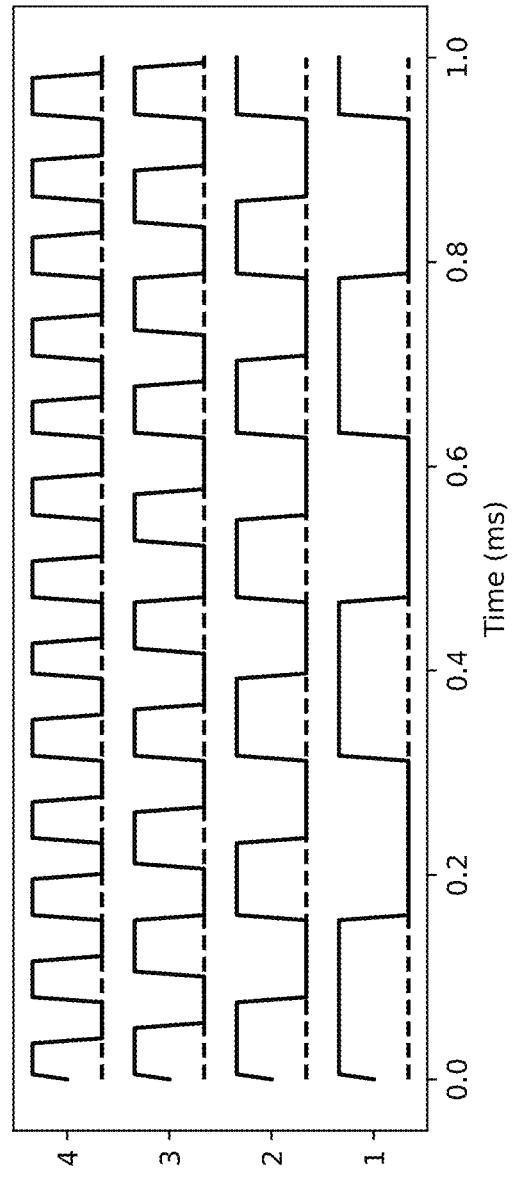

As previously described, beacon encoding may be implemented by temporal signatures (such as mutually orthogonal code sequences) or time-shifted pulses. This section provides examples of these encodings. FIGS. 8A and 8B are plots that illustrate example time-dependent encodings for four beacons, according to some embodiments. The x-axis of each plot represents time (in milliseconds), and the y-axis of each plot represents the amplitude the beacons (labeled 1-4). Since the modulation is amplitude-only in these examples, each plot shows a zero-emission baseline as a dashed line.

The plot in FIG. 8A shows four beacons with time-shifted pulse trains. In this arrangement, each beacon has a different time-shift, and the time-separation between pulses 1 and 4 is larger than the other pulses to differentiate the pulses. The plot in FIG. 8B shows four beacons with pulse trains of different frequencies. For some receiver architectures, the encodings in FIG. 8B may be differentiated more reliably than the encodings in FIG. 8A. That being said, many types of optical EDFAs (Erbium-doped Fiber Amplifiers) can provide higher pulse powers for the encodings in FIG. 8A compared to the encodings in FIG. 8B.

Figure 8C:
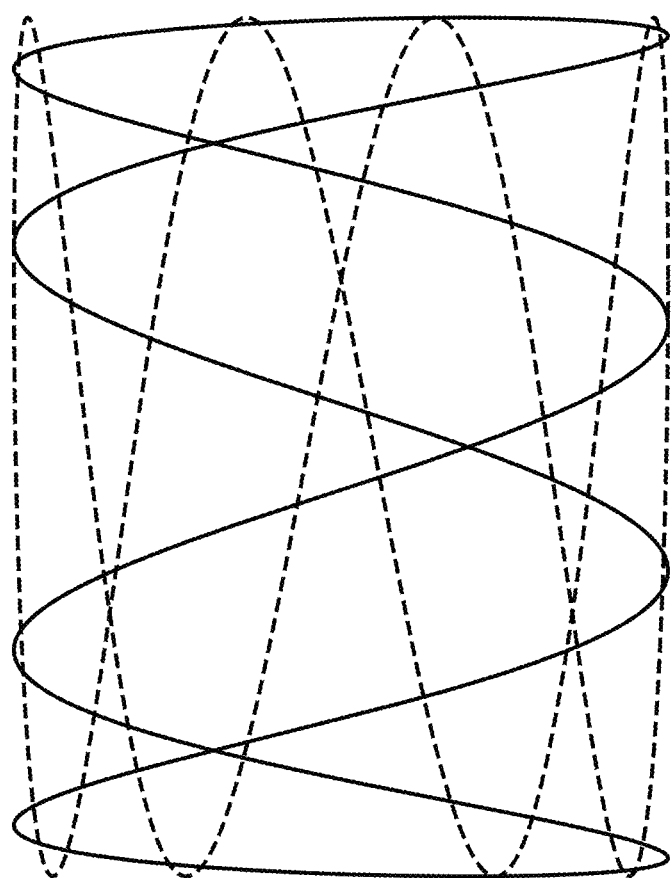

In some embodiments, a beacon encoding may be implemented by sweeping a smaller number of unmodulated beacons (e.g., 2) over intersecting patterns such that a receiver may determine its position by detecting, recording, and processing, for example, the rise, dwell, and fall of each beacon signal. In these embodiments, spatial and temporal encodings are implemented together. FIG. 8C shows an example of two quasi-orthogonal beacon sweep patterns, where one beacon may be swept along the solid-line path, while the other is, at the same time, swept along the dotted path. In this example, a receiver may determine its position by correlating beacons sweeping over it with amplitude and time-offsets from the known pattern. This approach may use more elaborate processing to extract beacon position than the encodings described with respect to FIGS. 8A and 8B.

Additional Data Communication

In some embodiments, one or more beacons are encoded with data (e.g., in addition to encodings that differentiate the beacons) so that terminals can communicate data in addition to, or alternative to, data in data encoded FSO beams (data encoding of the beacons may be orthogonal to the encoding of the encoded FSO beams). For example, data communication may be carried by on/off switching at 1 Gbps. A transmitter may use the same beacons for communication and for position finding if, for example, beacon encoding is performed by applying shallow AM modulation to the beacons at frequencies 10 kHz apart and different for each beacon. The "shallow" AM modulation may be strong enough for detection, yet large enough to not interfere with the data communication. For example, AM modulation amplitudes from 10 to 20 percent are practical.

In some embodiments, an optical communication station includes multiple (e.g., four or more) receivers around its main optical receiver. This may be used to develop additional information, such as the orientation (e.g., attitude) of the receiving station relative to the transmitter.

Additional Implementation Options

In some embodiments, a target to be tracked includes an optical retro-reflector that reflects light (e.g., beacons). In these embodiments, to sense reflected beacons, a receiver may be near the transmitter, or the transmitter and receiver may be a single system. These embodiments may be useful when the target doesn't (or can't) have receiver capabilities, or when it is desirable for the transmitter to determine the position of the target. For example, the target to be tracked may not have a power supply capable of supporting receiver components (e.g., described with respect to FIG. 3B). In some embodiments, the distance of a target with a retro-reflector may be determined using light detection and ranging (LIDAR) principles. Additionally, or alternatively, if beacon encoding is performed with multiple wavelengths (as described earlier), the target may be fitted with wavelength-selective filters or wavelength selective retro-reflectors so that the received reflected signals can be distinguished and processed independently. In some embodiments, a transmitter may adaptively modify beacon encodings to enhance measurement accuracy available through the retro-reflected signals. For example, the transmitter may emit narrower beacons and decrease their angular separation to more accurately cover a smaller range of angles known to be near the target's position.

Fiber-Bundle and Multi-Core Implementation Examples

Figure 9B:
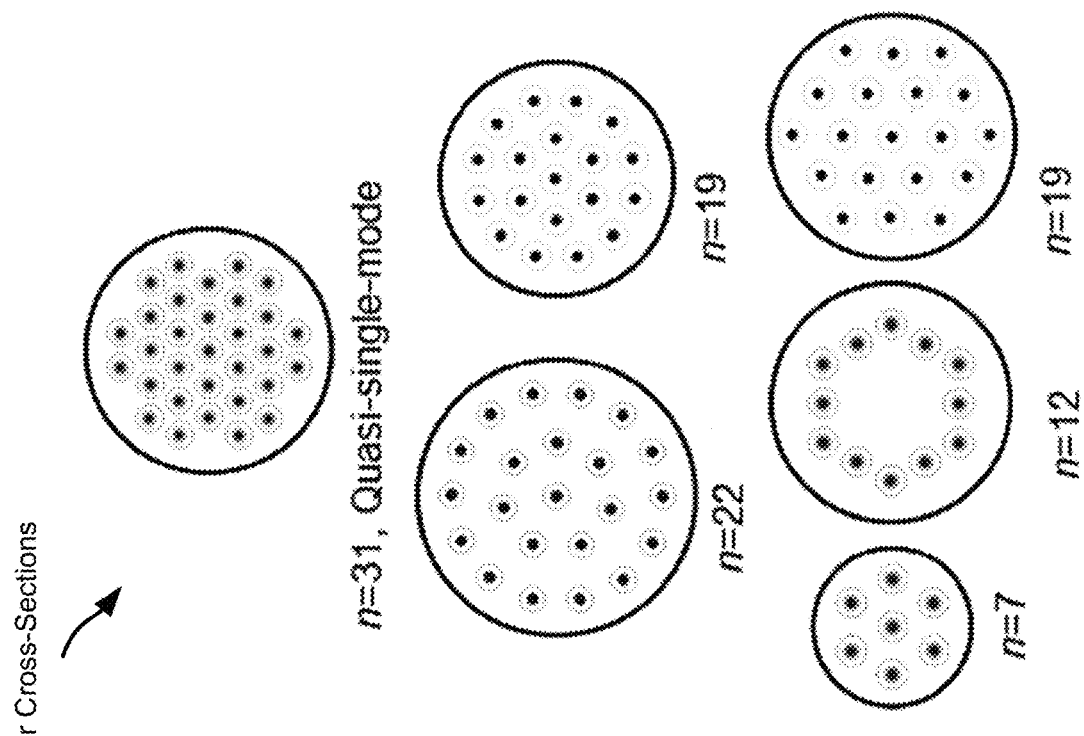
FIG. 9B are diagrams of example multicore arrangements that may be used to produce various beacon patterns.
Figure 9A:
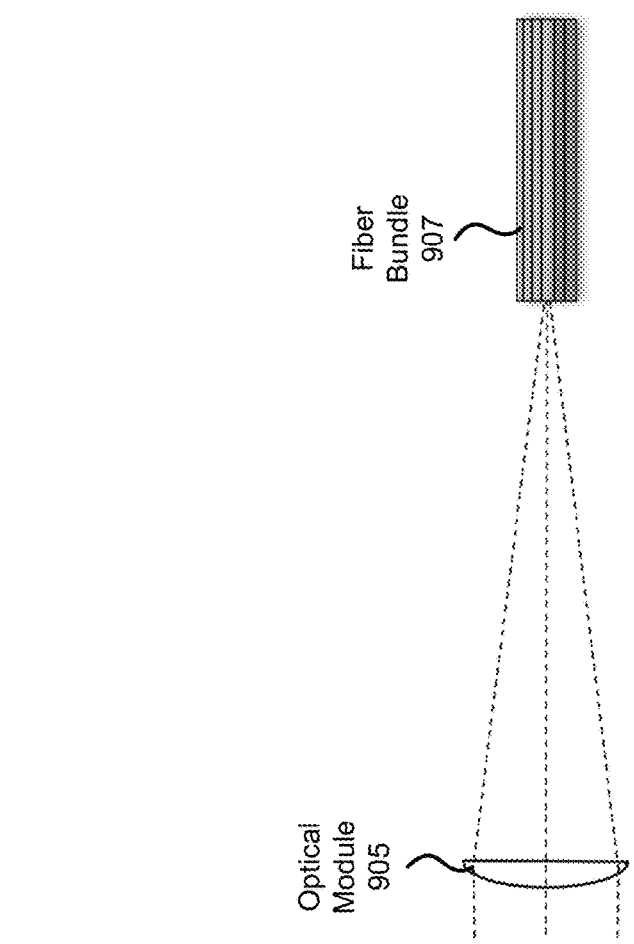
FIG. 9A is a diagram of a fiber bundle and optical module.

Referring to FIG. 9A, a transmitter may produce beacons through a bundle of optical fibers 907 with the ends positioned on the focal plane of an optical module 905 including one or more lenses. The optical module may include independent optical components (e.g., lenses) for each beacon or for groups of beacons. Additionally, or alternatively, the optical module may include optical components that optically affect all the beacons. In some embodiments, the optical module includes one or more Fresnel lenses to give a single beam a distribution with multiple 'lobes' yet where each 'beam lobe' can be disambiguated through multiple-beam overlay detection. The optical fibers in the bundle 907 may be arranged in, for example, a rectangular array or hexagonal array (a hexagonal array is often more convenient for fibers with a circular cross-section). A multi-core fiber may be used instead of a bundle of fibers. FIG. 9B shows example multicore arrangements that may be used to produce various beacon patterns.

To produce multiple beacons, a receiver may switch a single beacon source (e.g., 327) between the fibers or it may modulate the signal in each fiber to produce (e.g., uniquely) encoded beacons. The angular overlap between beacons may be determined by the divergence of the optical module. In some embodiments, an optical module uses variable focal length or diffusion screens to adjust beam divergence, total angular area covered, or beam overlap.

Example Beacon Components

FIGS. 10A-10B are diagrams that illustrate how a computing module (e.g., 305) of a receiver (e.g., 303) may determine the position of the receiver in a beacon spatial pattern. FIG. 10A is a diagram of a beacon spatial pattern 1005 that includes three overlapping beacons (the dotted circles represent edges of the beacons). The star represents the position of the receiver in the pattern 1005. The receiver is close to the beam axis of beacon 1, about midway between the edge and beam axis of beacon 2, and near the edge of beacon 3 (although the receiver doesn't know this). FIG. 10B is a diagram of the encodings 1010 of each beacon. The beacons are time-shifted pulse trains (similar to FIG. 8A). FIG. 10C is a diagram of an output signal 1015 received from a detector (e.g., 340) of the receiver. As previously discussed, an output signal is a (e.g., single) signal the includes components of beacons sensed by the detector, where the waveform of the signal depends on the position of the receiver in a beacon spatial pattern. In the example of FIG. 10C, the output signal 1015 includes contributions from beacons 1-3. Since the computing module knows beacon encodings 1010, the computing module separates the output signal into components. The components 1020 are illustrated in FIG. 10D. Since the receiver is closest to beacon 1 and farthest from beacon 3, the component of beacon 1 is the largest and the component of beacon 3 is the smallest. Based on the (e.g., relative) strengths of the components 1020 (and since the computing module knows the spatial pattern 1005), the computing module can determine its position in the spatial pattern. The computing module may also determine its position relative to a transmitter producing the pattern 1005 (e.g., since the computing module knows the position of the transmitter relative to the spatial pattern).

Example Method

Figure 11:
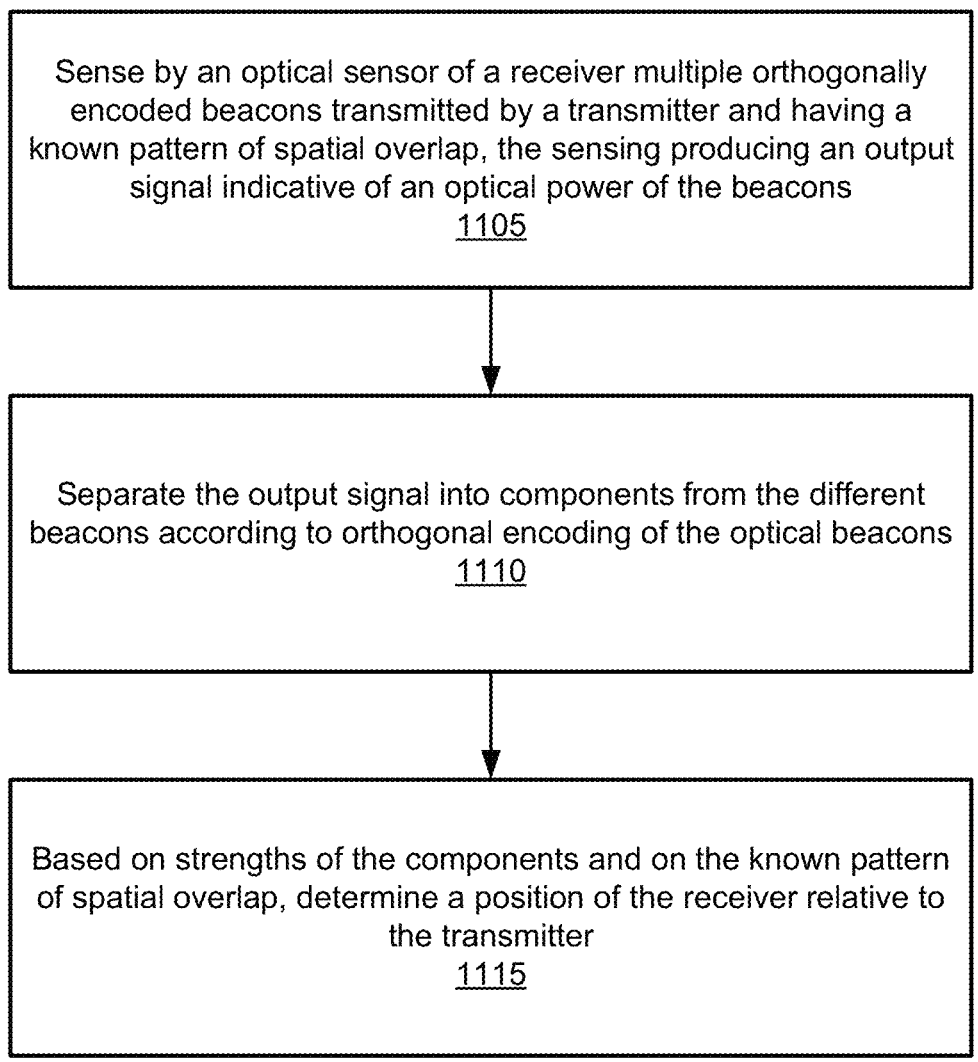
FIG. 11 is a flow chart illustrating a method for an FSO receiver terminal to determine its position relative to an FSO transmitter terminal

FIG. 11 is a flow chart illustrating a method for an FSO receiver terminal to determine its position relative to an FSO transmitter terminal, according to an embodiment. The steps of the method include different, additional, or fewer steps. The steps of the method may be performed by components of the receiver.

An optical sensor of the receiver senses 1105 multiple (e.g., two, three, or more), orthogonally encoded, optical beacons transmitted by the transmitter and having a known pattern of spatial overlap. For example, the multiple beacons are in a known pattern and have power distribution profiles that overlap at the sensor. The sensor may sense the overlapping beacons simultaneously. The sensor produces an output signal indicative of the optical power of the sensed (e.g., two, three, or more) overlapping beacons. The output signal may be an electrical signal or a data signal (e.g., timeseries data indicative of the optical power). The sensor may be a single photodetector or multiple photodetectors.

A computing system of the receiver separates 1110 the output signal into (e.g., signal) components from the different beacons according to the orthogonal encoding of the beacons. The components may indicate the sensed optical powers of the beacons (e.g., over a period of time).

Based on strengths of the components and on the known pattern of spatial overlap, the computing system determines 1115 a position of the receiver relative to the transmitter. Based on the determined position, the receiver may adjust its position relative to the transmitter (e.g., the computing system provides instructions for the receiver to adjust its position).

In some embodiments, based on strengths of the components and on the known pattern of spatial overlap, the computing system determines an orientation of the receiver relative to the transmitter (e.g., if the receiver has multiple spatially separated receive apertures). Based on the determined orientation, the receiver may adjust its orientation relative to the transmitter (e.g., the computing system provides instructions for the receiver to adjust its orientation).

In some embodiments, the optical sensor is a first sensor at a first location of the receiver and the receiver includes a second optical sensor at a second (e.g., different) location. The second sensor may also sense multiple, orthogonally encoded, overlapping beacons in the pattern. These beacons may be the same, a subset, a superset, an overlapping set, or a disjoint set of the beacons sensed by the first sensor. Similar to step 1110, the computing system may separate components from the beacons sensed by the second sensor. The position determined in step 1115 may be further based on the strengths of the components (from the beacons sensed by the second sensor). For example, the computing system determines positions of the first and second sensors and uses these positions to determine the overall position of the receiver. Additionally, or alternatively, the computing system may determine an orientation of the receiver based on signals from the first and second sensors.

In some embodiments, the receiver transmits the determined position (or orientation) of the receiver to the transmitter (e.g., so that the transmitter can adjust its pointing towards the position of the receive). This may be done, for example, via the receiver transmitting a data encoded FSO beam to the transmitter or a radio communication link between the transmitter and the receiver.

Additional Considerations

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

The term "module" is not meant to be limited to a specific physical form. Depending on the specific application, modules can be implemented as hardware, firmware, software, or combinations of these. Furthermore, different modules can share common components or even be implemented by the same components. There may or may not be a clear boundary between different modules, even if drawn as separate elements in the figures.

Depending on the form of the components, the "coupling" between components may take different forms. For example, dedicated circuitry can be coupled to each other by hardwiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values or quantities should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A system comprising:
   a free space optical (FSO) transmitter terminal configured to emit multiple, orthogonally encoded, optical beacons having a known pattern of spatial overlap; and
   an FSO receiver terminal comprising:
      an optical sensor configured to sense the overlapping optical beacons and produce an output signal indicative of an optical power of the overlapping optical beacons; and
      a computing system including a processor configured to execute instructions causing the processor to:
         separate the output signal into components based upon the orthogonal encoding of the optical beacons;
         evaluate strengths of the components; and
         determine a position of the FSO receiver terminal relative to the FSO transmitter terminal based on the strengths of the components and the known pattern of spatial overlap.

2. A method comprising:
   sensing, by an optical sensor of a free space optical (FSO) receiver terminal, multiple, orthogonally encoded, optical beacons transmitted by an FSO transmitter terminal and having a known pattern of spatial overlap, wherein the sensing produces an output signal indicative of an optical power of the overlapping optical beacons;
   separating the output signal into components based upon the orthogonal encoding of the optical beacons;
   evaluating strengths of the components; and
   determining a position of the FSO receiver terminal relative to the FSO transmitter terminal based on the strengths of the components and the known pattern of spatial overlap.

3. The method of claim 2, further comprising, adjusting the position of the FSO receiver terminal relative to the FSO transmitter terminal based on the determined orientation.

4. The method of claim 2, further comprising, based on strengths of the components and on the known pattern of spatial overlap, determining an orientation of the FSO receiver terminal relative to the FSO transmitter terminal.

5. The method of claim 4, further comprising, adjusting the orientation of the FSO receiver terminal relative to the FSO transmitter terminal based on the determined position.

6. The method of claim 2, wherein, the optical sensor is a single photon detector.

7. The method of claim 2, wherein an electrical output signal is indicative of an optical power of at least three overlapping optical beacons emitted by the FSO transmitter terminal.

8. The method of claim 2, wherein the multiple beacons are emitted from a same aperture of a remote terminal.

9. The method of claim 2, wherein the overlapping beacons include power distribution profiles that overlap at the optical sensor.

10. The method of claim 2, wherein the multiple beacons are sensed simultaneously.

11. The method of claim 2, wherein the beacons are propagating along different directions.

12. The method of claim 2, wherein the optical sensor is at a first location of a local FSO terminal, and further comprising, sensing, by a second sensor at a second location of the local FSO terminal the multiple overlapping beacons.

13. The method of claim 12, wherein determining the position of the local FSO terminal relative to a remote FSO terminal is further based on components of the overlapping beacons sensed by the second sensor and the first and second locations.

14. The method of claim 2, further comprising, transmitting the determined position of the FSO receiver to the FSO transmitter.

15. A non-transitory computer-readable storage medium comprising stored instructions that, when executed by a computing device, cause the computing device to perform operations including:

sensing by an optical sensor of a free space optical (FSO) receiver terminal multiple, orthogonally encoded, optical beacons transmitted by an FSO transmitter terminal and having a known pattern of spatial overlap, the sensing producing an output signal indicative of an optical power of the overlapping optical beacons;

separating the output signal into components based upon the orthogonal encoding of the optical beacons;

evaluating strengths of the components; and determining a position of the FSO receiver terminal relative to the FSO transmitter terminal based on the strengths of the components and the known pattern of spatial overlap.

16. The non-transitory computer-readable storage medium of claim 15, wherein the operations further include, adjusting the position of the FSO receiver terminal relative to the FSO transmitter terminal based on the determined orientation.

17. The non-transitory computer-readable storage medium of claim 15, wherein the operations further include, based on strengths of the components and on the known pattern of spatial overlap, determining an orientation of the FSO receiver terminal relative to the FSO transmitter terminal.

18. The non-transitory computer-readable storage medium of claim 17, wherein the operations further include, adjusting the orientation of the FSO receiver terminal relative to the FSO transmitter terminal based on the determined position.

19. The non-transitory computer-readable storage medium of claim 15, wherein, the optical sensor is a single photon detector.

20. The non-transitory computer-readable storage medium of claim 15, wherein the electrical output signal is indicative of an optical power of at least three overlapping optical beacons emitted by the FSO transmitter terminal.

* * * * *